(12) United States Patent
Jodan et al.

(10) Patent No.: US 8,274,561 B2
(45) Date of Patent: Sep. 25, 2012

(54) SURVEILLANCE CAMERA

(75) Inventors: Hiroaki Jodan, Daito (JP); Shinichiro Okamura, Shijonawate (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 1428 days.

(21) Appl. No.: 11/837,108

(22) Filed: Aug. 10, 2007

(65) Prior Publication Data

US 2008/0158355 A1 Jul. 3, 2008

(30) Foreign Application Priority Data

Aug. 10, 2006 (JP) .................................. 2006-217952

(51) Int. Cl.
*H04N 7/18* (2006.01)
*G03B 17/00* (2006.01)

(52) U.S. Cl. .......................... 348/143; 348/151; 396/427

(58) Field of Classification Search .................. 348/143
See application file for complete search history.

(56) References Cited

U.S. PATENT DOCUMENTS

| | | | | |
|---|---|---|---|---|
| 4,890,713 A * | 1/1990 | Pagano | ...................... | 192/142 R |
| 5,159,368 A * | 10/1992 | Zemlin | ......................... | 396/427 |
| 5,179,421 A * | 1/1993 | Parker et al. | ............ | 356/139.06 |
| 5,289,090 A * | 2/1994 | Miller et al. | ................... | 318/282 |
| 5,289,091 A * | 2/1994 | Wada | ............................. | 318/282 |
| 5,627,616 A * | 5/1997 | Sergeant et al. | ............. | 396/427 |
| 5,870,135 A * | 2/1999 | Glatt et al. | ...................... | 348/39 |
| 6,027,257 A * | 2/2000 | Richards et al. | ............. | 396/428 |
| 6,130,704 A * | 10/2000 | Ely et al. | ....................... | 348/143 |
| 6,203,216 B1 * | 3/2001 | Koizumi | ......................... | 396/427 |
| 6,507,366 B1 * | 1/2003 | Lee | ............................... | 348/352 |
| 6,685,366 B1 * | 2/2004 | Corbin | .......................... | 396/427 |
| 6,714,236 B1 * | 3/2004 | Wada et al. | .................... | 348/152 |
| 7,038,709 B1 * | 5/2006 | Verghese | ........................ | 348/169 |
| 7,151,558 B1 * | 12/2006 | Kogane et al. | ................ | 348/151 |
| 7,586,537 B2 * | 9/2009 | Konishi et al. | ................ | 348/373 |
| 2002/0044214 A1 * | 4/2002 | Hovanky | ....................... | 348/373 |

(Continued)

FOREIGN PATENT DOCUMENTS

JP 11-510341 A 9/1999

(Continued)

OTHER PUBLICATIONS

SANYO Catalog; Greater Precision and Dependability in Surveillance Technology.

(Continued)

*Primary Examiner* — David Lazaro
*Assistant Examiner* — Robert Shaw
(74) *Attorney, Agent, or Firm* — Westerman, Hattori, Daniels & Adrian, LLP

(57) ABSTRACT

A surveillance camera comprising an image capturing portion having a rotational drive portion for rotatingly driving an image capturing lens about a pan axis and an initial position sensor providing a reference to the pan angle of the image capturing lens, a base for the image capturing portion to be attached thereto with the pan axis positioned toward a changeable direction, a controller electrically connected to the drive portion and the initial position sensor, and restrictive portion for mechanically restricting the permissible pan angle of the image capturing lens to different angles in accordance with the direction of the image capturing portion as attached to the base. The controller detects the direction of the image capturing portion as attached to the base based on the angle of rotation of the drive portion and the position of the initial position sensor.

6 Claims, 7 Drawing Sheets

U.S. PATENT DOCUMENTS

| | | | |
|---|---|---|---|
| 2002/0085844 A1* | 7/2002 | Tashiro et al. | 396/427 |
| 2003/0103160 A1* | 6/2003 | Tatewaki et al. | 348/375 |
| 2003/0185556 A1* | 10/2003 | Stiepel et al. | 396/427 |
| 2004/0032492 A1* | 2/2004 | Wada et al. | 348/143 |
| 2006/0193626 A1* | 8/2006 | Kim et al. | 396/427 |

FOREIGN PATENT DOCUMENTS

| | | | |
|---|---|---|---|
| WO | 97/05741 | A1 | 2/1997 |
| WO | 2005/004586 | A1 | 5/2005 |

OTHER PUBLICATIONS

Chinese Office Action dated May 12, 2010, issued in corresponding Chinese Patent Application No. 200710143220.

Japanese Office Action dated Jan. 10, 2012, issued in corresponding Japanese Patent Application No. 2006-217952.

* cited by examiner

F I G. 3
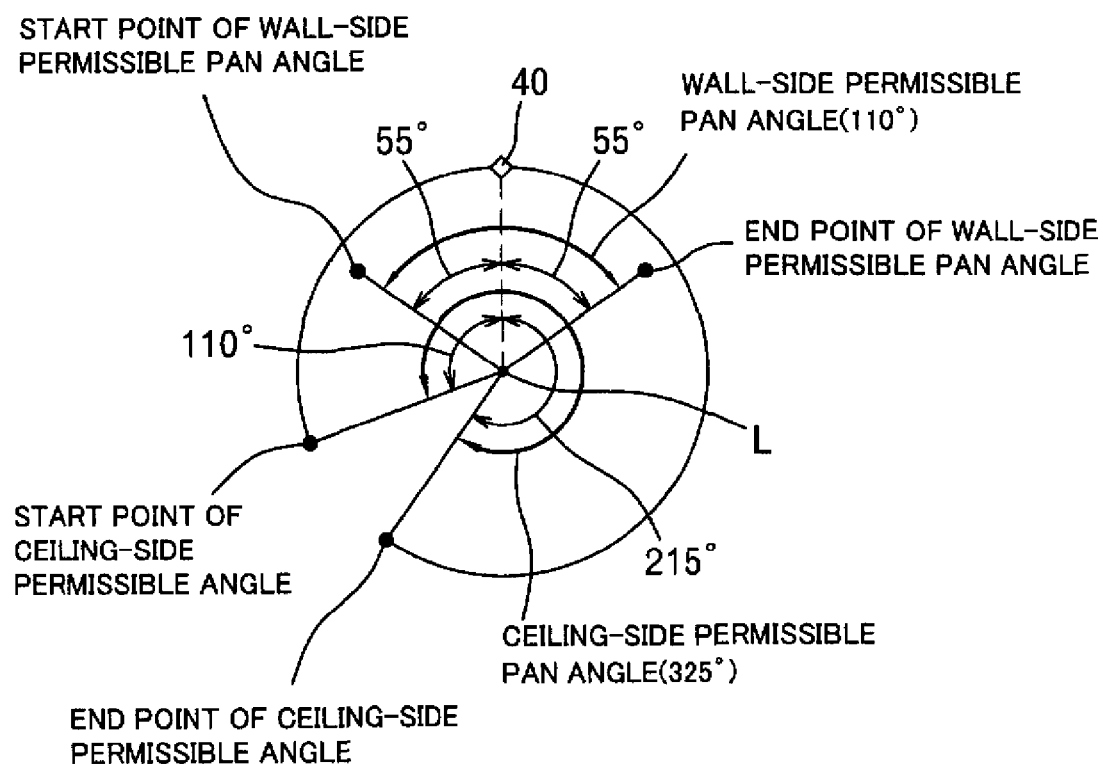

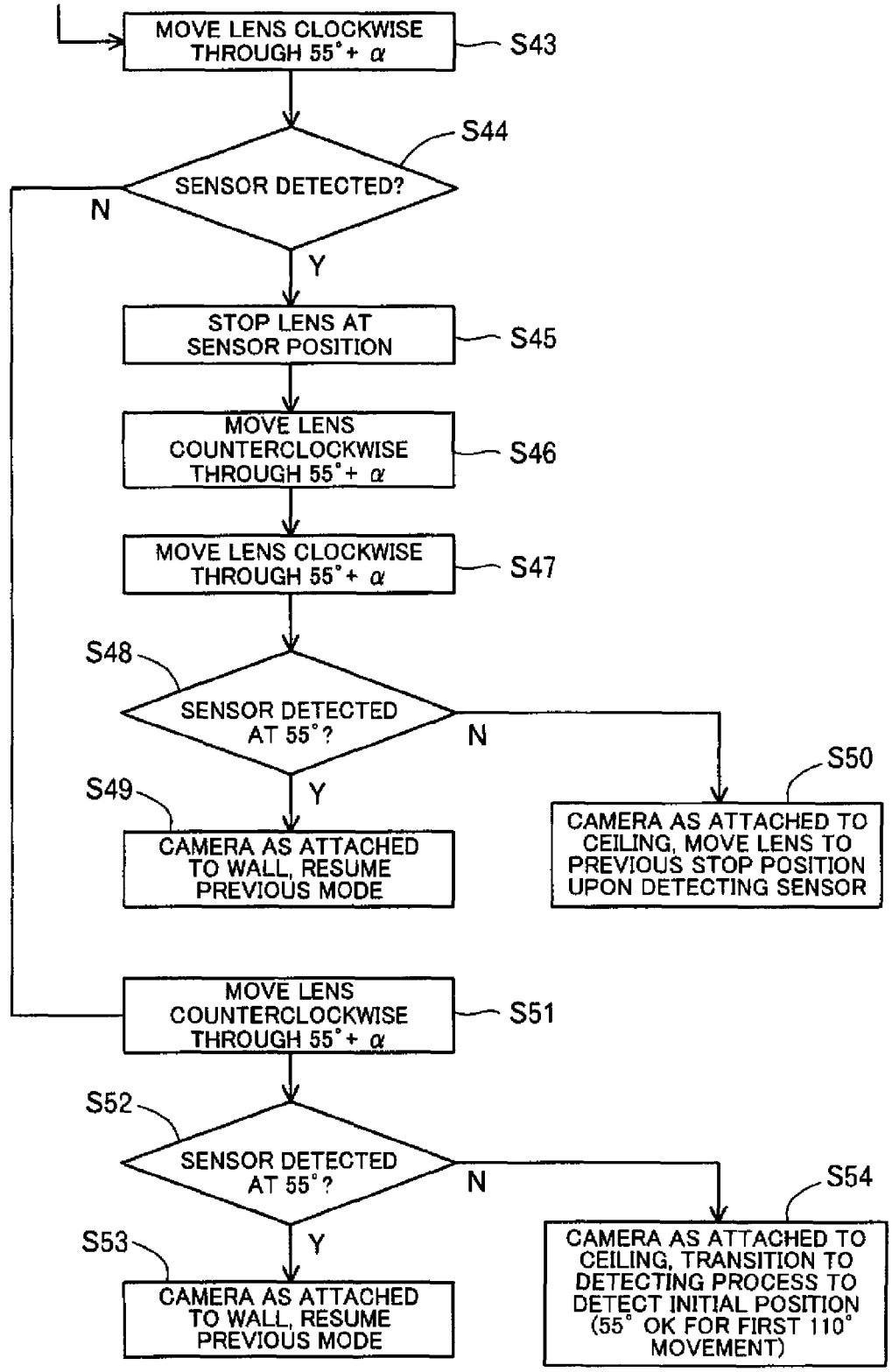

SURVEILLANCE CAMERA

TECHNICAL FIELD

The present invention relates to surveillance cameras comprising an image capturing lens which differs in pan angle when mounted in different directions, and more particularly to a surveillance camera which is adapted to automatically discriminate the direction of mounting.

BACKGROUND ART

Surveillance cameras comprise an image capturing lens housed, for example, in a dome-shaped casing and rotatable in a pan direction. Surveillance cameras are adapted to be attached generally to ceilings, and are so designed that the pan axis of the image capturing lens is positioned perpendicular when the camera is attached to the ceiling.

When surveillance cameras of the type described are to be mounted on walls, it is practice to attach a bracket to the wall and mount the camera on the bracket with the pan axis positioned perpendicular.

When to be mounted on the wall, the surveillance camera requires a bracket because the pan axis of the image capturing lens is then positioned at an angle 90 degree different from the pan axis of the camera as attached to the ceiling.

However, the use of the bracket for mounting needs time and labor, entails an increase in the number of parts and results in an impaired appearance since the bracket attached is a projection on the wall.

Accordingly, surveillance cameras are proposed in which the direction of mounting the image capturing lens is shiftable through 90 degree within the casing and which are mountable on the ceiling or on the wall with the pan direction positioned perpendicular.

With the surveillance camera which is shiftable in the direction of installation of the image capturing lens, the angle of rotation (pan angle) in the pan direction must be different when the camera attached to the ceiling and when it is attached to the wall This is attributable to the following reason. For wide-angle surveillance with the camera as attached to the ceiling, the pan angle needed is nearly 360 degree (for example, 325 degree), whereas if the camera as attached to the wall remains adjusted to wide-angle use, the pan angle will include an area which requires no surveillance, for example, the wall area to which the camera is attached. When the camera is to be attached to walls, therefore, the pan angle must be smaller than is needed for attaching to ceilings, namely, up to 180 degree (e.g., 110 degree).

To change the pan angle after changing the direction of installation of the image capturing lens, it is necessary to alter settings in the control program.

The altered settings will be provided by manipulating switches or by an on-screen display (OSD) function, whereas the pan angle will not be fully satisfactory or will include an unnecessary range beyond the desired pan angle when the operator forgets to provide settings, hence the problem of impaired surveillance performance.

SUMMARY OF THE INVENTION

To overcome the foregoing problems, the present invention provides a surveillance camera comprising:
an image capturing portion having an image capturing lens, a rotational drive portion for rotatingly driving the image capturing lens about a pan axis and an initial position sensor providing a reference to the pan angle of the image capturing lens,
a base for the image capturing portion to be attached thereto with the pan axis positioned toward a changeable direction,
a controller electrically connected to the rotational drive portion and the initial position sensor, and
a restrictive portion disposed on the image capturing portion and/or the base for mechanically restricting the permissible pan angle of the image capturing lens to different angles in accordance with the direction of the image capturing portion as attached to the base,
wherein the controller detects the direction of the image capturing portion as attached to the base based on the angle of rotation of the rotational drive portion and the position of the initial position sensor.

BRIEF DESCRIPTION OF THE DRAWINGS

FIG. 3 is a diagram showing a ceiling-side pan angle and a wall-side pan angle;

FIG. 9 is a flow chart following FIG. 8.

DESCRIPTION OF THE PREFERRED EMBODIMENTS

Figure 1:
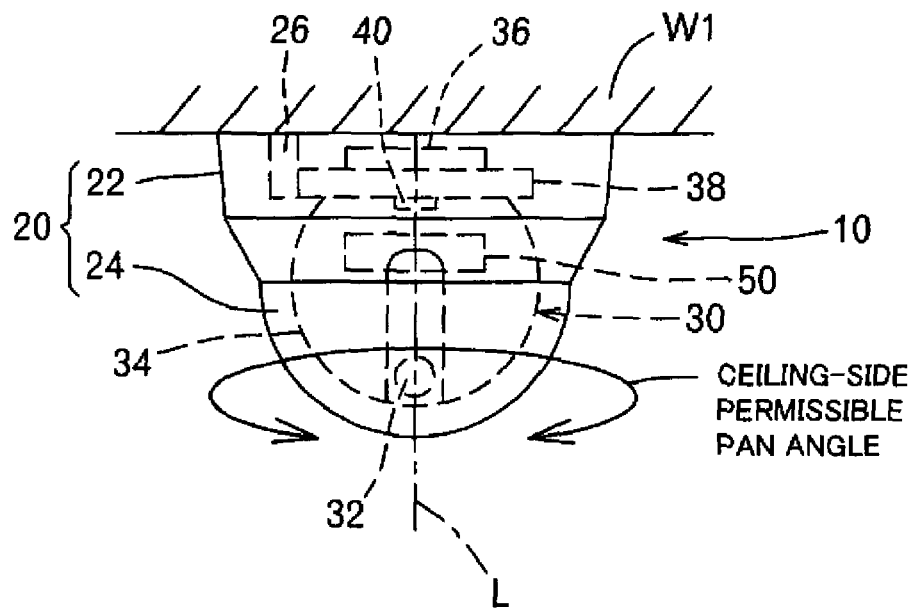
FIG. 1 is a side elevation showing a surveillance camera embodying the invention and attached to a ceiling.
Figure 2:
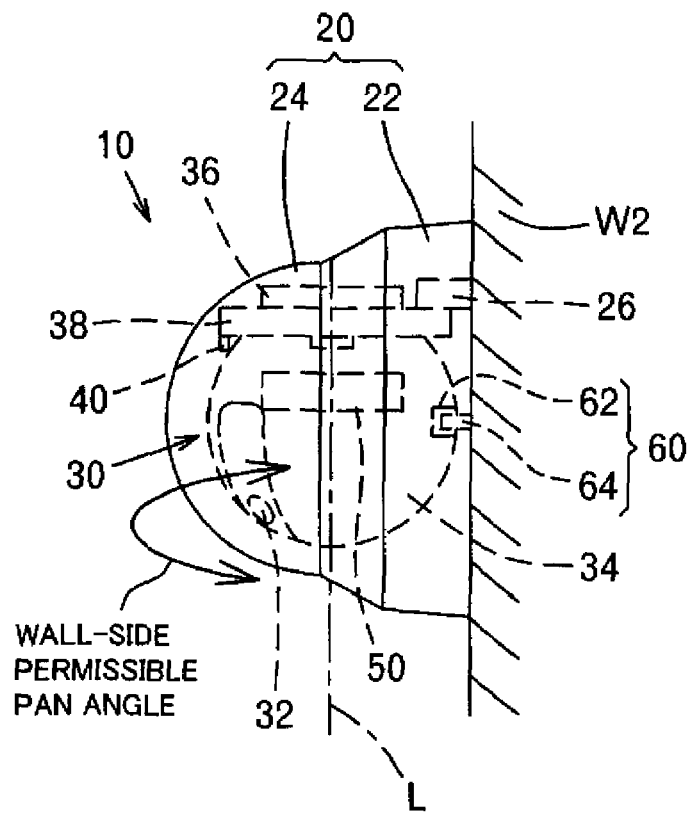
FIG. 2 is a side elevation showing the surveillance camera embodying the invention and attached to a wall.

FIGS. 1 and 2 are side elevations showing an example of surveillance camera 10 which can embody the present invention. The surveillance camera 10 comprises a base 22 which can be attached to a ceiling W1 (see FIG. 1) or wall W2 (FIG. 2), and an image capturing portion 30 housed in a casing 20 in the form of a domed-shaped transparent cover 24.

The image capturing portion 30 comprises a generally spherical shell 34 provided with an image capturing lens 32 and coupled to a rotational drive portion 36 so as to be rotatingly drivable about a pan axis L. The drive portion 36 has a mount portion 38 on the base 22. The mount portion 38 is connected to an attaching member 26 provided on the base 22, whereby the image capturing portion 30 is attached to the base 22.

The rotational drive portion 36 can be composed of a motor and a reduction gear mechanism. Preferably, the motor or reduction gear mechanism is made idly rotatable when operating beyond a permissible pan angle provided by a restrictive portion 60. The drive portion 36 may be so adapted that the motor is brought to a halt upon detecting the load thereon.

The motor is controlled in response to a drive command from the controller 50 to be described later, and is rotatable forward or reversely. The motor can be, for example, a stepping motor. The drive command from the controller 50 includes in this case the direction of rotation and the number of steps. The stepping pulses from the motor are fed to the controller 50 and counted by the controller 50. Incidentally, the term "the angle of rotation of the motor" as used hereinafter means an angle for rotating the image capturing lens 32 through a specified angle, and does not means the actual angle of rotation of the motor.

The illustrated image capturing lens 32 is movable not only in the pan direction but is also movable in the tilt direction by a tilt direction drive portion (not shown) for reciprocatingly moving the lens 32 in the tilt direction.

With the surveillance camera 10 of the present invention, the image capturing portion 30 can be attached to the base 22 with the pan axis L directed perpendicular to the base 22 (ceiling W1) as seen in FIG. 1, and with the pan axis L positioned in parallel to the base 22 (wall W2) as shown in FIG. 2.

With reference to FIG. 3, the image capturing lens 32 is different in permissible pan angle when the base 22 is attached to the ceiling W1 (hereinafter referred to as the "ceiling-side permissible pan angle") and when the base 22 is attached to the wall W2 (hereinafter referred to as the "wall-side permissible pan angle"). The ceiling-side permissible pan angle is set at a larger value than the wall-side permissible pan angle, and can be set, for example, at 325 degree. The wall-side permissible pan angle can be set at a smaller value than the ceiling-side permissible pan angle, for example, at 110 degree. The permissible pan angle is not limited to such two values but can be set at three or more values, for example, if the base 22 is attached at an angle of 45 degree. In the following description, the largest of the permissible pan angles to be set, i.e., the largest of the pan angles through which the image capturing leans 32 is rotatable, namely, the angle corresponding to the ceiling-side permissible pan angle in the above example will be referred to the "maximum pan angle."

The permissible pan angle is mechanically limited by the restrictive portion 60 provided in the image capturing portion 30 and/or the base 22. For example as shown in FIG. 2, the restrictive portion 60 can be provided by grooves 62 formed in the peripheral surface of the shell 34 in the pan direction and different in length (only one is shown), and an engaging member 64 provided on the base 22 and fitting in one of the grooves 62 depending on the direction of attaching. The grooves correspond to the respective permissible pan angles in length in the peripheral direction.

With the restrictive portion 60 described above, the shell 34 rotates with the projecting engaging member 64 fitting in one of the grooves 62 depending on the direction in which the image capturing portion 30 is attached, the contact of the engaging member 64 with the groove end restricts the pan angle of the shell 34.

Figure 4:
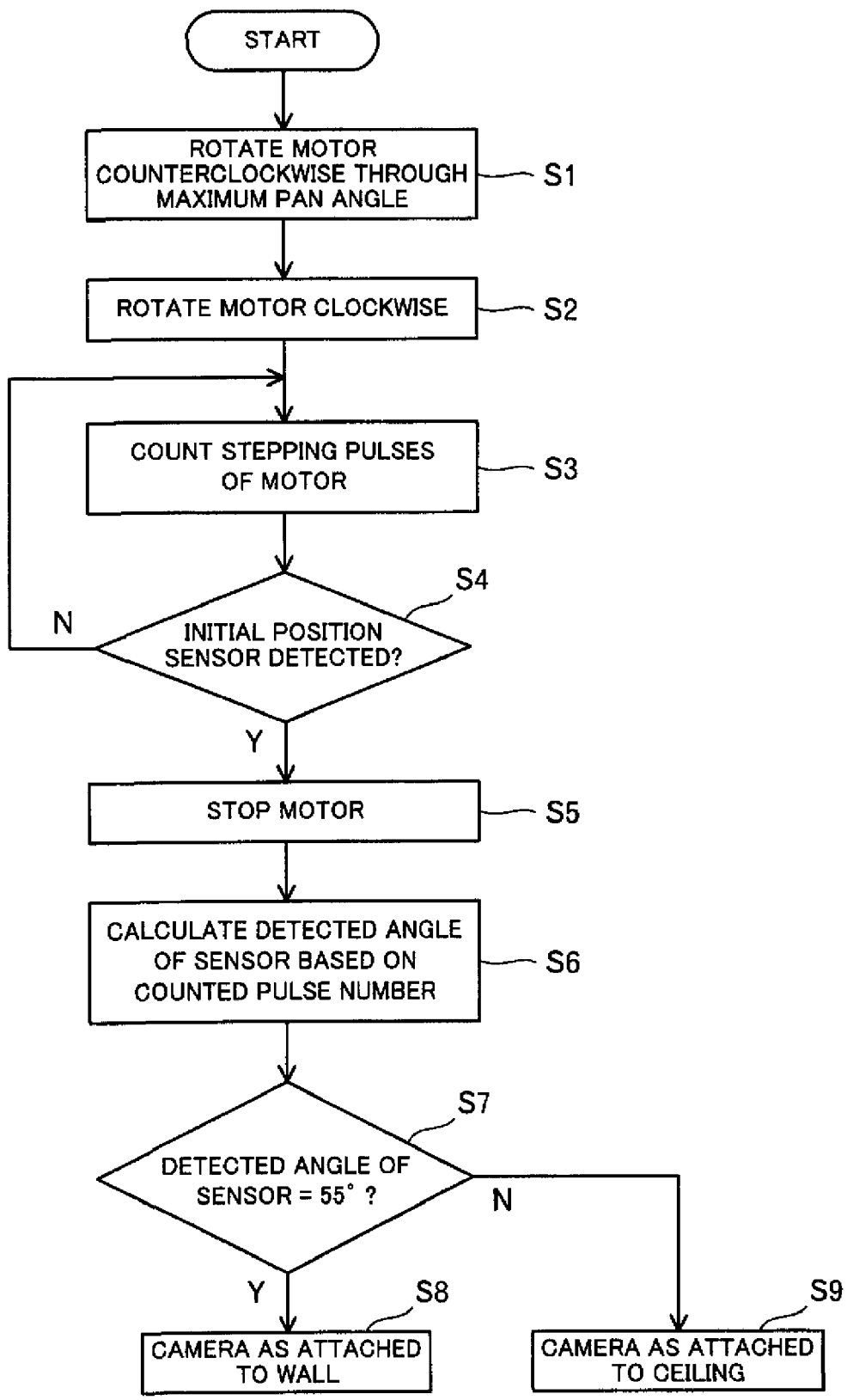
FIG. 4 is a flow chart of a procedure for discriminating the attaching direction of an image capturing lens.
Figure 5:
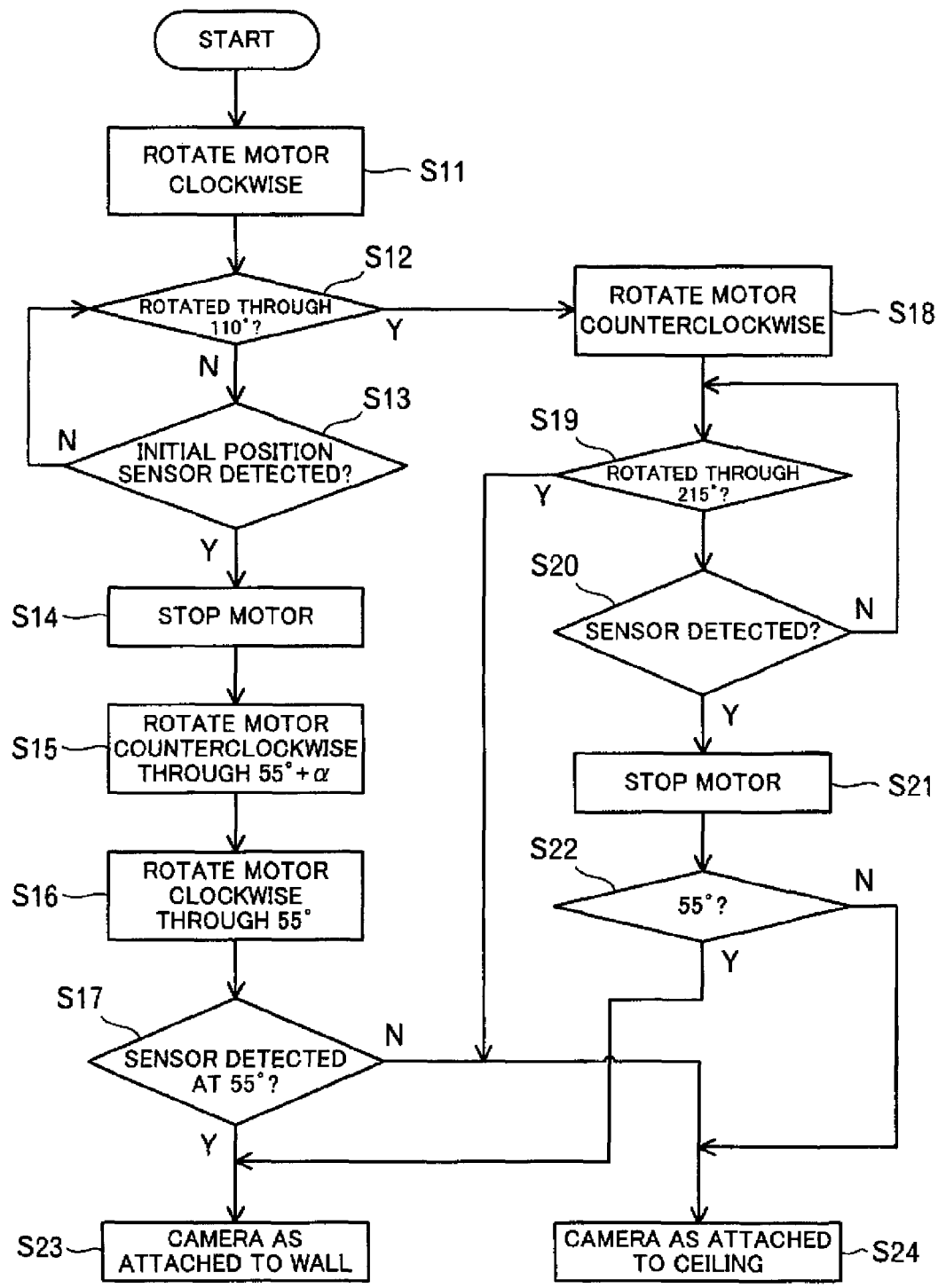
FIG. 5 is a flow chart of a different procedure for discriminating the attaching direction of the image capturing lens.

With the example shown in FIG. 3, the start points, as well as the end points, of the ceiling-side permissible pan angle and the wall-side permissible pan angle are held out of coincidence, and the start points of these angles are 55 degree shifted from each other, so as to discriminate the attaching direction and initial position with reference to the flow chart of FIG. 5. In discriminating the attaching direction and initial position with reference to the flow chart of FIG. 4, the start points or the end points may be in coincidence.

With reference to FIGS. 1, 2, etc., the path of rotating movement of the shell 34 in the pan direction is provided with an initial position sensor 40 for detecting the initial position. The initial position sensor 40 cooperates with the rotational drive portion 36 during the usual surveillance operation for the controller 50 to detect the direction of the image capturing lens 32. According to the present invention, the initial position sensor 40 is used for discriminating the direction of the image capturing lens 32 as installed in position without the necessity of using an additional sensor. For example, a Hall element, magnetic sensor or the like is usable as the initial position sensor 40. In the illustrated embodiment, the sensor 40 is disposed in the middle of the wall-side permissible pan angle.

The image capturing lens 32, the rotational drive portion 36 and the initial position sensor 40 are electrically connected to the controller 50 which is disposed at a suitable portion of the shell 34 and/or the base 22.

The controller 50 feeds the images captured by the lens 32, for example, to a personal computer and gives a drive command to the motor of the rotational drive portion 36 or the tilt direction drive portion to control the lens 32 toward the desired direction. The controller 50 receives data from the initial position sensor 40 and drive data (e.g., stepping pulses) from the motor of the rotational drive portion 36 to discriminate the pan direction of the image capturing lens 32.

In the case where the image capturing portion 30 having the lens 32 and the structure described above is attached to the base 22 with the pan axis L positioned in different directions as shown in FIGS. 1 and 2, the lens 32 is rotated in the pan direction, and the direction in which the image capturing portion 30 is attached is discriminated from the angle of rotation of the drive portion 36 and the position of the initial position sensor 40.

In the case where the surveillance camera 10 is to be attached to the ceiling W1 before the discrimination of the attaching direction and initial position, the worker fixes the mount portion 38 to the attaching member 26 to attach the image capturing portion 30 to the base 22 with the pan axis L positioned perpendicular to the ceiling W1 as seen in FIG. 1. When the surveillance camera 10 is to be mounted on the wall W2, the worker fixes the mount portion 38 to the attaching member 26 to attach the image capturing portion 30 to the base 22 with the pan axis L positioned in parallel to the wall W2 as shown in FIG. 2.

In this state, the controller 50 discriminates the direction of the image capturing portion 30 of the camera of the invention as installed in place and the initial position of the lens 32 according to the flow chart of FIG. 4.

First, the controller 50 operates the motor of the rotational drive portion 36 counterclockwise through the maximum pan angle (325 degree in the example of FIG. 3) in step 1. Regardless of where the image capturing lens 32 is positioned, this brings the lens 32 to the start point of the ceiling-side pan angle when the camera is attached to the ceiling or to the start point of the wall-side pan angle when the camera is attached to the wall. Subsequently, a clockwise rotation drive command is given to the motor of the drive portion 36 to rotate the motor clockwise (step 2). At this time, the stepping pulses of the motor are counted up (step 3). The rotation of the motor rotates the image capturing lens 32 clockwise to detect the initial position sensor 40 (step 4). The controller 50 stops the motor upon receiving a signal from the initial position sensor 40 (step 5) and calculates the detected angle of the initial position sensor 40 from the number of stepping pulses counted (step 6). In the example of FIG. 3 as attached to the wall, the initial position sensor 40 is detected at the position of a pan angle of 55 degree from the start point. In the case of the camera attached to the ceiling, on the other hand, the initial position sensor 40 is detected at the position of a pan angle of 110 degree from the start point. Accordingly, if the angle detected by the sensor 40 is 55 degree (step 7), the angle indicates that the surveillance camera 10 is attached to the wall W2 (step 8), whereas if the angle is otherwise (step 7), that is, if the angle detected by the sensor 40 is 110 degree, this indicates that the surveillance camera 10 is attached to the ceiling W1 (step 9).

Thus, whether the surveillance camera 10 is attached to the ceiling W1 or the wall W2 can be automatically discriminated easily based on the rotation of the rotational drive portion 36 and the position of the initial position sensor 40. This eliminates the need for the worker to input the attaching direction to obviate a setting error. Further because the motor is held at halt at the position where the initial position sensor 40 is detected, the setups for the subsequent control steps can be made quickly.

FIG. 5 is a flow chart of a different procedure for discriminating the attaching direction.

Figure 6:
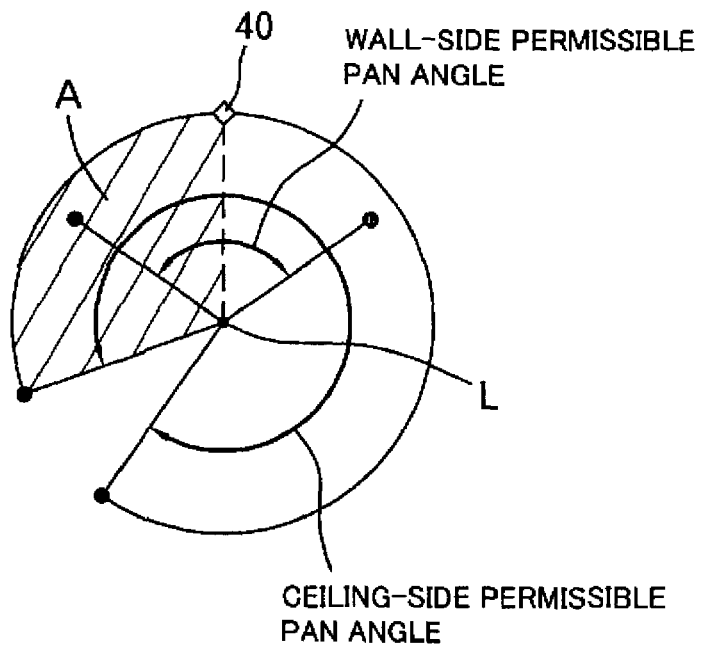
FIG. 6 is a diagram showing a relationship between the position of the image capturing lens and the ceiling-side pan angle and the wall-side pan angle.

With reference to FIG. 5, the motor of the rotational drive portion 36 is first driven clockwise so as to rotate the image capturing lens 32 through 110 degree (steps 11 and 12). When the initial position sensor 40 is detected (step 13) while the motor is in rotation, the motor is brought to a halt (step 14). As this time, the image capturing lens 32 is in a position facing the sensor 40 shown in FIG. 3. The sensor 40 is thus detected by steps 11 to 14 when the image capturing lens 32 is positioned in the range of 110 degree counterclockwise from the initial position when the discrimination is started as indicated by a region A in FIG. 6.

Incidentally, when the angle of the sensor 40 detected is in excess of 55 degree at this time, this immediately indicates that the camera 10 is attached to the ceiling.

The motor is then rotated counterclockwise through 55 degree+alpha (alpha is an angle greater than 0, e.g., 15 degree) from this position (step 15). In the case where the image capturing lens 32 is attached to the wall W2, this brings the lens 32 to the start point of the wall-side pan angle, permitting the drive portion 36 to rotate idly. When the lens is attached to the ceiling W1, on the other hand, the lens 32 rotates to a position counterclockwise beyond the start point of the wall-side pan angle.

The motor is rotated clockwise through 55 degree from this state (step 16). In the case where the camera 10 is attached to the wall, the initial position sensor 40 can be detected (step 17). This indicates that the camera 10 is attached to the wall W2 (step 23). In the case of attachment to the ceiling, on the other hand, the clockwise rotation of the motor through 55 degree still fails to detect the sensor 40. The failure to detect the sensor 40 (step 17) indicates that the camera is attached to the ceiling (step 24).

Figure 7:
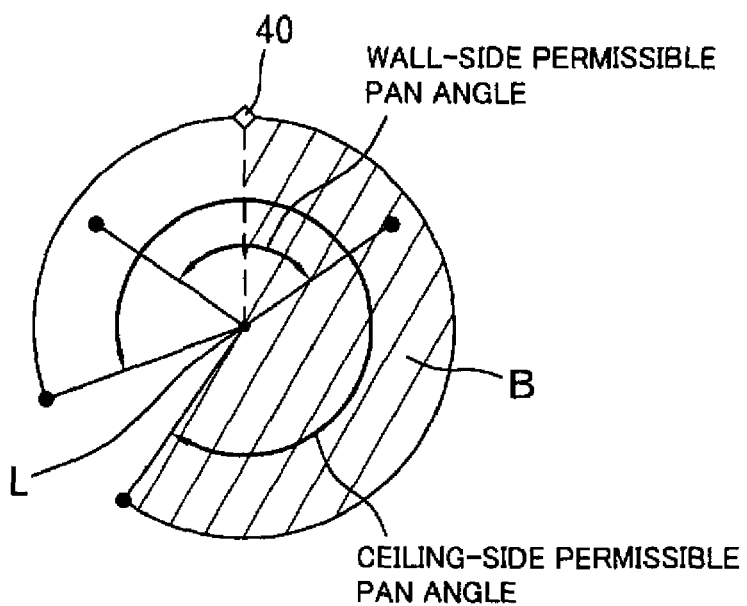
FIG. 7 is a diagram showing another relationship between the position of the image capturing lens and the ceiling-side pan angle and the wall-side pan angle.

If the sensor remains undetected even by the clockwise rotation of the motor through 110 degree in step 12, the lens 32 is positioned in a region B of FIG. 7 (that is, the lens 32 is located at a position other than the range of 110 degree counterclockwise from the initial position) when the discrimination is started.

In this case, a command to drive the motor counterclockwise through 215 degree is given (steps 18 and 19). The motor is rotated counterclockwise through a maximum angle of 215 degree until the sensor 40 is detected (steps 20, 21).

In the case where the camera is attached to the wall, steps 11 and 12 bring the image capturing lens 32 to the end point of the wall-side pan angle when the discrimination is started. Accordingly, the initial position is invariably detected (step 20) before the motor is rotated counterclockwise through 215 degree. When the sensor 40 is detected, the motor is halted (step 21). If the angle detected is 55 degree (step 22), this indicates that the surveillance camera 10 is attached to the wall (step 23). If otherwise, that is, if the angle is 110 degree, this indicates that the camera 10 is attached to the ceiling (step 24).

In the case where the counterclockwise rotation of the motor through 215 degree fails to detect the sensor 40 when the discrimination is started (steps 18, 19 and 20), the camera 10 is found to be attached to the ceiling (step 24). Stated more precisely, the sensor 40 is detected by the rotation through 215 degree.

The procedure described above readily indicates automatically whether the camera 10 is attached to the ceiling W1 or to the wall W2, based on the rotation of the drive portion 36 and the position of the initial position sensor 40. This eliminates the need for the worker to input the attaching direction, obviating setting errors.

In the flow chart of FIG. 5 also, the motor eventually comes to a halt at the position where the sensor 40 is detected, consequently ensuring quick setups for various subsequent control steps.

The foregoing embodiments are adapted not only to discriminate the attaching direction of the image capturing lens 32 but also to stop the lens 32 at the position where the initial position sensor 40 is detected. The invention is not limited to the flow charts described insofar as at least the attaching direction of the image capturing lens 32 can be discriminated.

Figure 8:
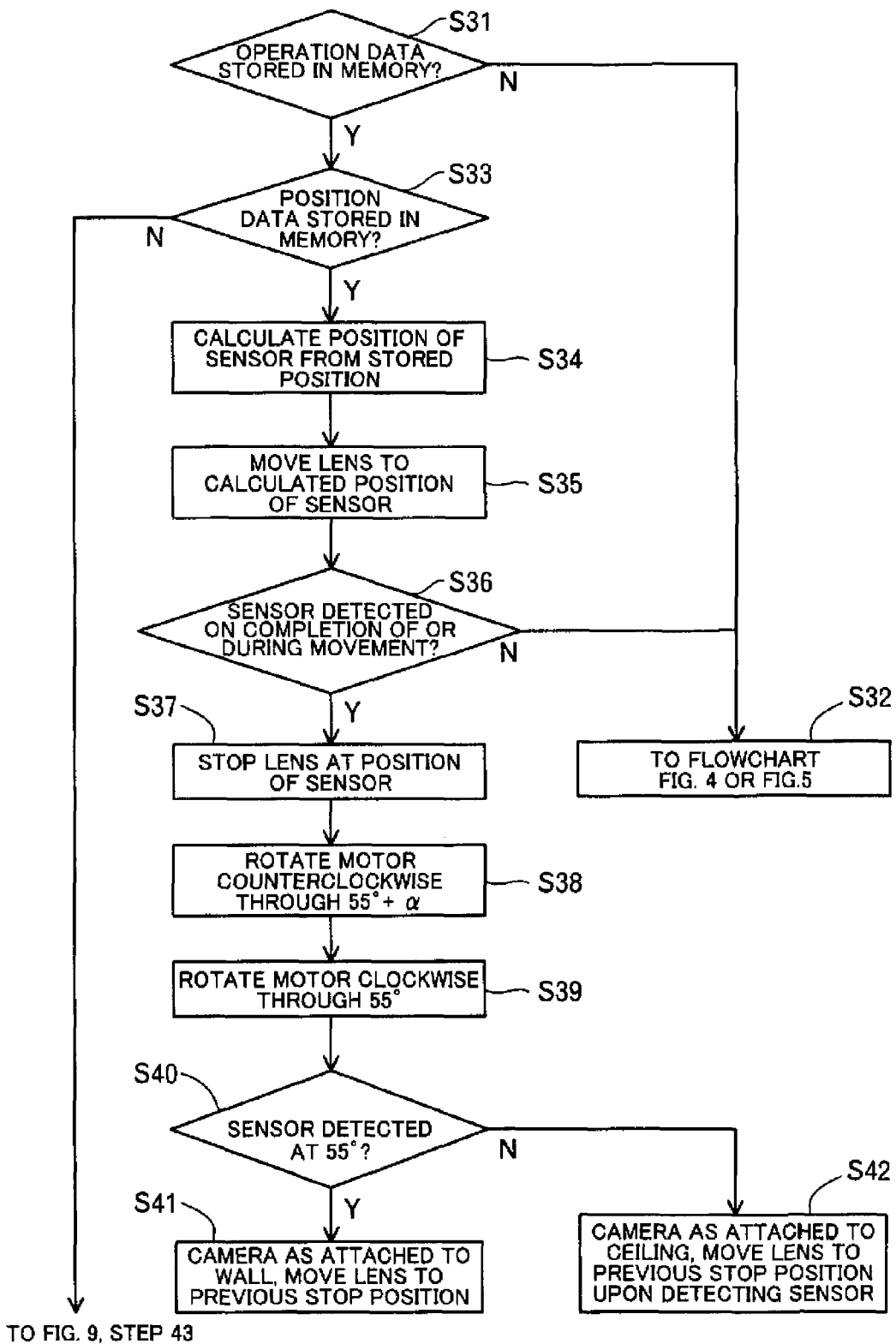
FIG. 8 is a flow chart of another different procedure for discriminating the attaching direction the image capturing lens.

The flow charts of FIGS. 8 and 9 show another different embodiment of the invention. This embodiment is adapted to diminish the idle rotation of the rotational drive portion 36 to a greater extent than those shown in the flow charts of FIGS. 4 and 5 to ensure reduced noise.

With this embodiment, the controller 50 has a memory for storing the data as to the previous operation of the surveillance camera 10. When the camera 10 is to be installed for the first time or when the power source is turned on again after having been turned off, the camera is checked as to whether it is attached to the ceiling or wall with reference to the data stored in the memory.

The operation data to be stored in the memory can be, for example, the position data of the lens 32 or data as to the operation mode of the lens 32 at the time of the completion of the previous operation of the camera 10. The data as to the operation mode is, for example, an autopan mode in which the lens 32 is automatically oscillated sideways or a sequence mode in which the lens 32 is moved to a predetermined point. According to the embodiment, both the position data and the operation mode are not stored in the memory, but one of them is stored in the memory because in the case of the operation mode, especially the autopan mode or sequence mode, the data is incessantly updated with the movement of the image capturing lens 32, becomes stored a large number of times and can not be stored.

In the case where no operation data is stored in the memory when the power source of the camera 10 is turned on (step 31), this is interpreted as indicating an initial start-up, so that the attaching direction of the lens 32 is discriminated based on the flow chart of FIG. 4 or 5 (step 32).

When the memory has operation data stored therein (step 32), the data is checked as to whether it is position data or operation mode data (step 33). If it is position mode, step 34 follows. When it is operation mode data, the sequence proceeds to FIG. 9, step 43.

If the memory has position data stored therein (step 33), the controller 50 calculates the position of the initial position sensor 40 from the position data stored in the memory (step 34) and operates the rotational drive mans 36 so as to move the lens 32 to the calculated sensor position (step 35). When the sensor 40 is detected upon completion of the movement of the lens 32 or during the movement (step 36), the controller stops the drive portion 36 (step 37), rotates the motor counterclockwise through 55 degree+alpha as in the flow chart of FIG. 5, steps 15 to 17 (step 38), thereafter rotates the motor clockwise through 55 degree (step 39) and discriminates the camera as attached to the wall (step 41) or to the ceiling (step 42) in accordance with whether the sensor 40 is detected at 55 degree (step 40). After the discrimination, it is desirable to move the lens 32 to the previous stop position with reference to the position data stored in the memory as required, so as to continue the movement at the time of previous stop.

If the sensor 40 is not detected in step 36, there is the possibility that the position of installation of the camera 10 has been changed, so that the camera is checked for the attaching direction according to the flow chart of FIG. 4 or 5 (step 32).

In the case where the operation mode data is found stored in the memory instead of the position data in the flow chart of FIG. 8, step 33, the drive portion 36 is operated to move the lens 32 clockwise through 55 degree+alpha (step 43). In step 43, the lens 32 is moved through the angle of 55 degree+alpha on the premise that the camera 10 is attached to the wall. This diminishes the idle rotation of the drive portion 36 unlike the camera as attached to the ceiling to result in reduced noise.

When the sensor is detected (step 44) after step 43, the camera as attached to the wall or ceiling is discriminated as in steps 37 to 42 (steps 44 to 50).

In the case where step 43 fails to detect the initial position sensor 40, the lens 32 is moved counterclockwise through 55 degree+alpha (step 51). When the sensor is detected at 55 degree (step 52), the camera as attached to the wall is discriminated (step 53). If otherwise, the camera as attached to the ceiling is discriminated (step 54).

When the camera is found attached to the wall (steps 49, 53), the operation mode stored in the memory is resumed since the lens 32 is halted at a position facing the sensor 40.

If the camera is found attached to the ceiling (steps 50, 54), on the other hand, the lens 32 is not opposed to the sensor 40 as indicated by the step 48 or 52, so that the drive portion 36 is operated to detect the sensor 40, followed by an operation in the previous mode.

The procedure described above readily indicates automatically whether the camera 10 is attached to the ceiling W1 or to the wall W2, based on the rotation of the drive portion 36 and the position of the initial position sensor 40. This eliminates the need for the worker to input the attaching direction, obviating setting errors.

The embodiment described above has the advantage that the idle rotation of the drive portion 36 can be diminished to ensure reduced noise when the surveillance camera 10 is used only in the nighttime or when the camera 10 is operated after the power supply thereto has been cut off. Further the camera 10 can be operated quickly based on the previous position data or operation mode.

What is claimed is:

1. A surveillance camera comprising:
    an image capturing portion having an image capturing lens, a rotational drive portion that rotatingly drives the image capturing lens about a pan axis and an initial position sensor that detects an initial image capturing lens position that is a reference to the pan angle of the image capturing lens, the image capturing portion being arranged on a path of rotational movement of the image capturing lens,
    a base having the image capturing portion attached thereto in a first direction toward a ceiling or in a second direction toward a wall, such that a pan axis of the image capturing portion is substantially vertical, regardless of the direction of the image capturing portion as attached to the base
    a controller electrically connected to the rotational drive portion and the initial position sensor, wherein the controller detects which of the first or second direction the image capturing portion as attached to the base is in, based on the angle of rotation of the rotational drive portion and a position where the initial position sensor detects the image capturing lens, and
    a restrictive portion disposed on the image capturing portion and/or the base that mechanically restricts the permissible pan angle of the image capturing lens to different angles in accordance with either the first or second direction of the image capturing portion as attached to the base;
    wherein the controller rotates the rotational drive portion according to a predetermined condition, the predetermined condition being the rotation of the image capturing lens through the greatest of the pan angles through which the lens is rotatable, and the rotation of the image capturing lens in a reverse direction after the rotation, and detects which of the first or second direction the image capturing portion as attached to the base is in, based on the angle of rotation of the rotational drive portion when the initial position sensor detects the image capturing lens.

2. The surveillance camera according to claim 1 wherein the rotational drive portion rotates forward or reversely in response to a drive command from the controller and idly rotates after the image capturing lens has reached a permissible pan angle.

3. The surveillance camera according to claim 1 wherein the rotational drive portion rotates forward or reversely in response to a drive command from the controller and stops after the image capturing lens has reached a permissible pan angle.

4. The surveillance camera according to claim 1 wherein the rotational drive portion rotates forward or reversely in response to a drive command from the controller and idly rotates after the image capturing lens has reached a permissible pan angle.

5. The surveillance camera according to claim 1 wherein the rotational drive portion rotates forward or reversely in response to a drive command from the controller and stops after the image capturing lens has reached a permissible pan angle.

6. A method for detecting an attaching direction of a surveillance camera having an image capturing lens, and restricting a permissible pan angle of the image capturing lens accordingly, the surveillance camera having:
    an image capturing portion having an image capturing lens, a rotational drive portion that rotatingly drives the image capturing lens about a pan axis and an initial position sensor that detects an initial image capturing lens position that is a reference to the pan angle of the image capturing lens, the image capturing portion being arranged on a path of rotational movement of the image capturing lens,
    a base having the image capturing portion attached thereto in a first direction toward a ceiling or in a second direction toward a wall, such that a pan axis of the image capturing portion is substantially vertical, regardless of the direction of the image capturing portion as attached to the base and
    a restrictive portion disposed on the image capturing portion and/or the base that mechanically restricts the permissible pan angle of the image capturing lens to different angles in accordance with either the first or second direction of the image capturing portion as attached to the base, the method comprising electrically connecting the rotational drive portion to the initial position sensor with a controller, and detecting which of the first or second direction the image capturing portion attached to the base is in based on the angle of rotation of the rotational drive portion and a position where the initial position sensor detects the image capturing lens;

wherein the controller rotates the rotational drive portion according to a predetermined condition, the predetermined condition being the rotation of the image capturing lens through the greatest of the pan angles through which the lens is rotatable, and the rotation of the image capturing lens in a reverse direction after the rotation, and detects which of the first or second direction the image capturing portion as attached to the base is in, based on the angle of rotation of the rotational drive portion when the initial position sensor detects the image capturing lens.

\* \* \* \* \*